Figure 1:
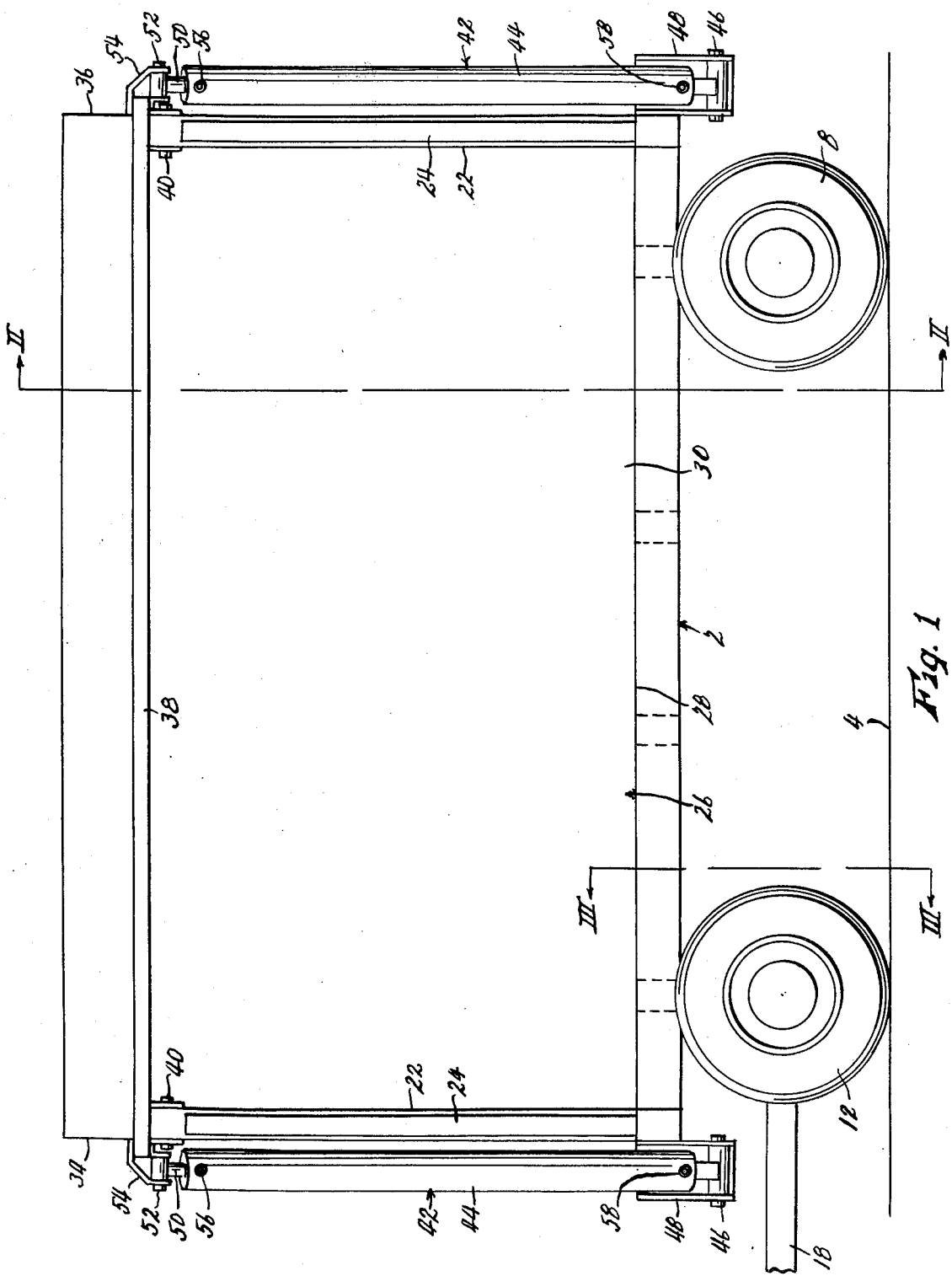

United States Patent [19]
Bishop

[11] 3,995,894
[45] Dec. 7, 1976

[54] LATERAL STABILIZER FOR DUMP TRUCKS

[75] Inventor: Jerald W. Bishop, Osborne, Kans.

[73] Assignee: Gilmore-Tatge Manufacturing Co., Inc., Clay Center, Kans.

[22] Filed: Nov. 17, 1975

[21] Appl. No.: 632,212

[52] U.S. Cl. .............................. 298/10; 298/17 S; 298/18
[51] Int. Cl.² ......................................... B60P 1/16
[58] Field of Search .................... 298/10, 17 S, 18

[56] References Cited
UNITED STATES PATENTS 3,712,675   1/1973   Schoenwald ..................... 298/17 S

FOREIGN PATENTS OR APPLICATIONS 1,288,635   2/1962   France ........................ 298/17 S Primary Examiner—Robert J. Spar
Assistant Examiner—George F. Abraham
Attorney, Agent, or Firm—John A. Hamilton

[57] ABSTRACT

In a dump truck having a dump bucket pivotally mounted along one of its upper side edges to a bed, and a power device for tilting said bucket to dump its contents, said bed being supported by two axles carrying ground-engaging wheels, being pivotally mounted on one of said axles on a fore-and-aft axis, a stabilizer for locking the bed against tilting on its fore-and-aft axis during the dumping operation, the stabilizer consisting of cooperating ratchets and pawls carried respectively by the bed and pivoted axle and normally engaged to prevent tilting of the bed, the dump bucket being operable by movement thereof to its normal upright position to disengage the pawls and ratchets.

5 Claims, 6 Drawing Figures

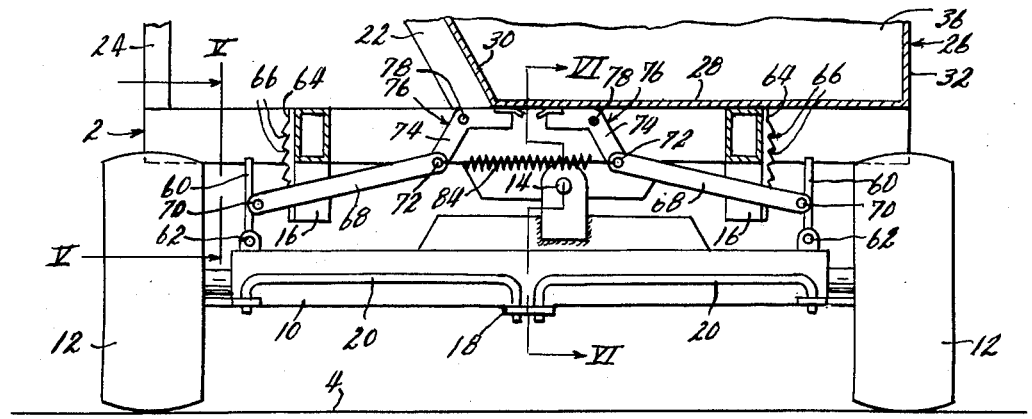
Fig. 3
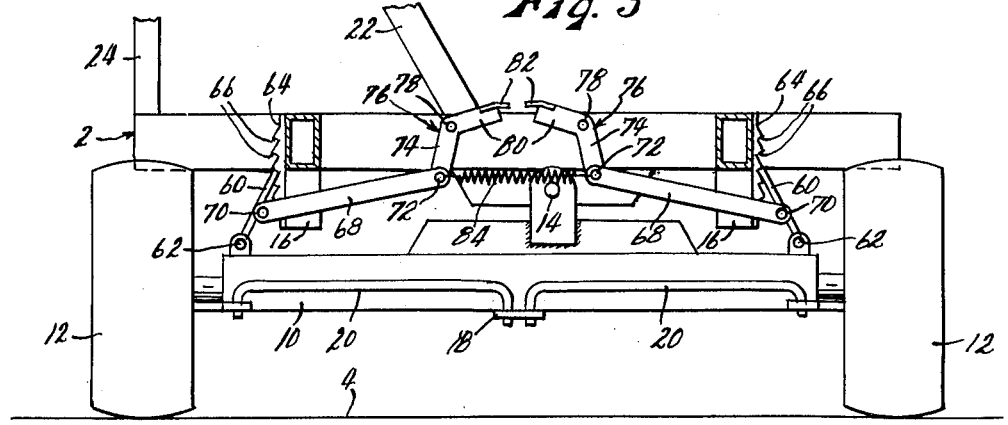
Fig. 4
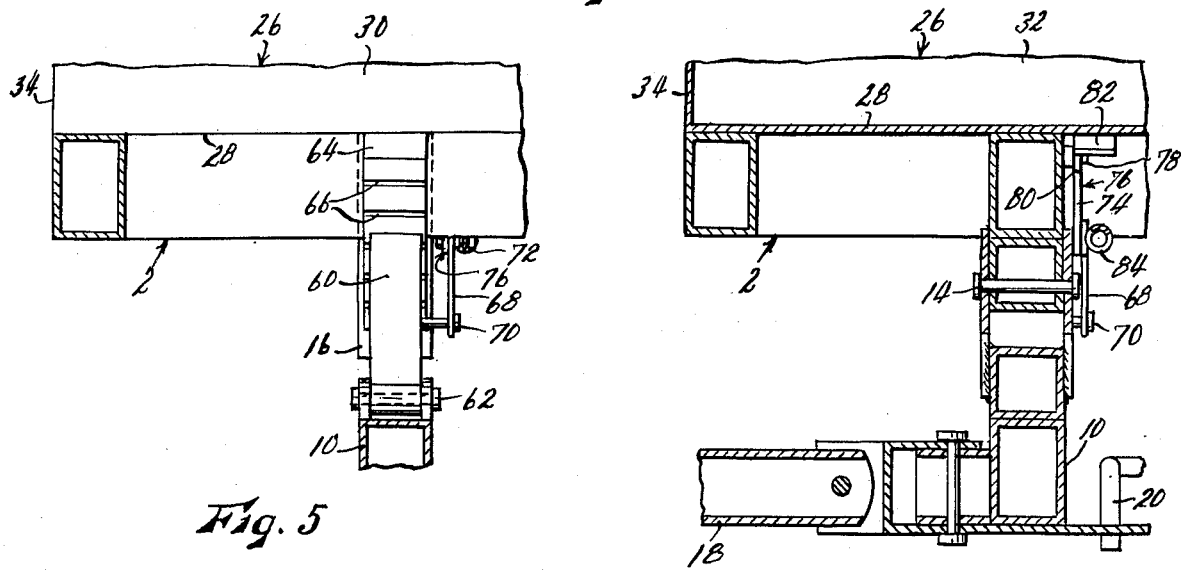
Fig. 5
Fig. 6

LATERAL STABILIZER FOR DUMP TRUCKS

This invention relates to new and useful improvements in dump trucks, and has particular reference to a lateral stabilizer for preventing lateral tilting of the truck bed during the dumping operation.

In many dump trucks, the actual dump bucket is pivoted along one of its upper side edges to struts rising from the truck bed, and is dumped by tilting it about its pivotal axis, during which process its center of gravity is moved very substantially toward the side of the bed at which the bed is being dumped. The bed itself is supported by ground-engaging wheels carried by transverse axles. In a two-axle truck, the bed must be tiltable laterally of the truck relative to at least one of the axles, in order that all four wheels (one at each end of each axle) will rest on the ground as the truck moves over uneven terrain. During the dumping operation, this titling will tend to occur due to the lateral shifting of the bucket load, and can result in torsional stresses on the bed about a longitudinal axis, since the bed can tilt relative to one axle but not the other. This may cause malfunctioning of mechanical elements of the bed, or damage thereto. In extreme cases, actual overturning of the entire truck may occur. In a dump truck wherein the bed is supported on the axles by spring suspensions, the described lateral tilting of the truck bed during dumping can also occur, regardless of the number of axles, since the bed is tiltable relative to the axles.

Accordingly, the principal object of the present invention is the provision, in a dump truck of the character described having a bed supported by ground-engaging wheels carried by one or more transverse axles, and in which said bed is tiltable laterally on the truck relative to at least one of said axles, of a stabilizer device operable to lock said bed against lateral tilting relative to said axle, said stabilizer being adapted to be used during the dumping operation.

Another object is the provision of a lateral stabilizer of the character described which is entirely automatic, being engaged and disengaged at the appropriate times without requiring attention or action by the operator.

A further object is the provision of a lateral stabilizer of the character described which is operable automatically in response to the position of the dump bucket, being engaged whenever the bucket moves from its normal upright position at the beginning of a dumping cycle, and disengaged whenever said bucket is returned to its normal upright position.

Other objects are simplicity and economy of construction, efficiency and dependability of operation, and adaptability for application to a wide variety of types and styles of dump trucks.

Figure 2:
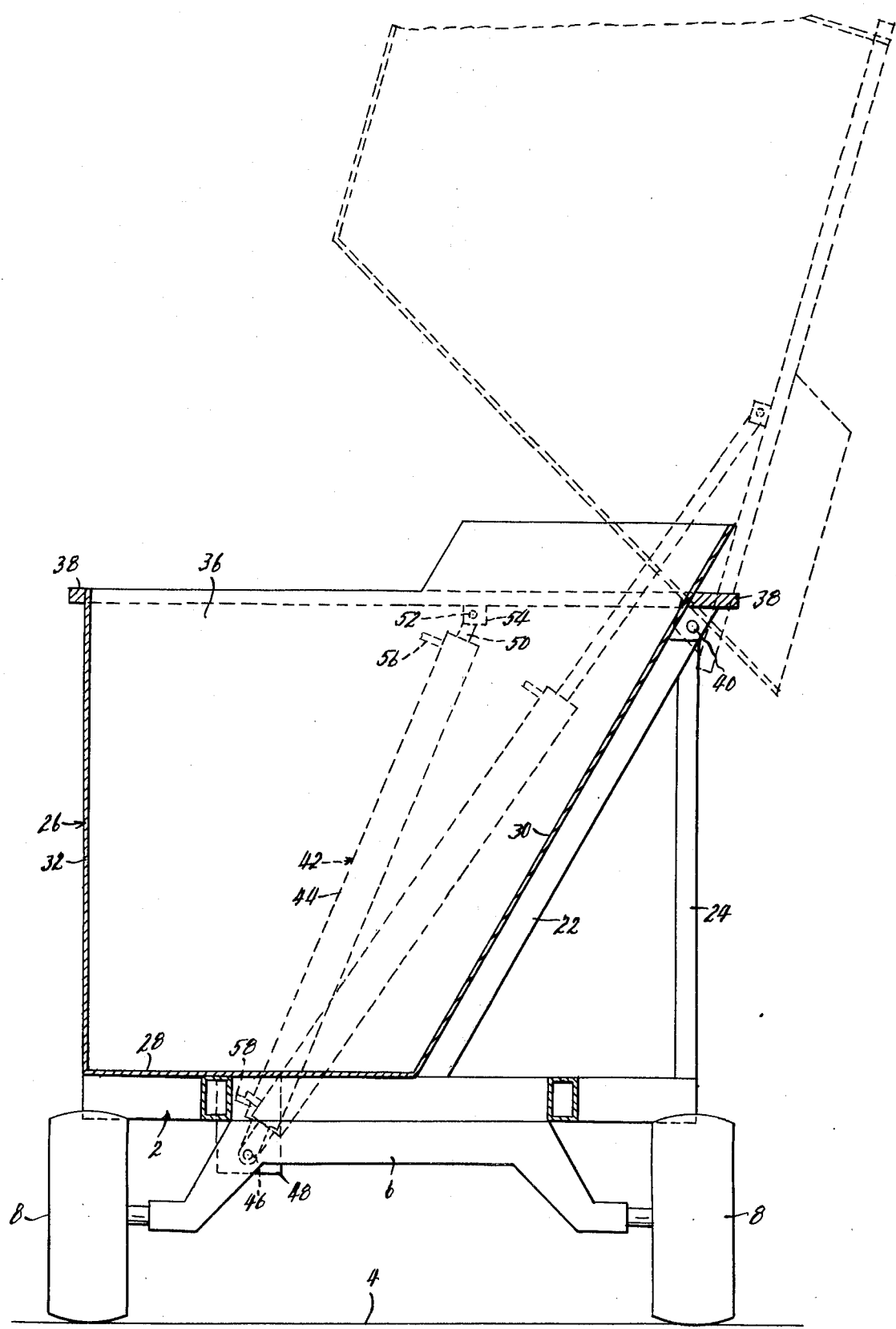

With these objects in view, as well as other objects which will appear in the course of the specification, reference will be had to the accompanying drawing, wherein:

FIG. 1 is a side elevational view of a dump truck embodying lateral stabilizer locks embodying the present invention, partially broken away, FIG. 2 is a sectional view taken on line II—II of FIG. 1, showing the dump bucket in its normal upright position in solid lines, and tilted to its dump position in dotted lines, FIG. 3 is a fragmentary sectional view taken on line III—III of FIG. 1, showing the stabilizer locks disengaged, FIG. 4 is a view similar to FIG. 3, showing the stabilizer locks engaged, FIG. 5 is an enlarged, fragmentary sectional view taken on line V—V of FIG. 3, and FIG. 6 is an enlarged, fragmentary sectional view taken on line VI—VI of FIG. 3.

Like reference numerals apply to similar parts throughout the several views, and the numeral 2 applied to the bed of a dump truck. While the details of said truck bed are not pertinent to the prevent invention, it comprises generally a horizontal, rectangular, rigid platform. It is supported above ground level 4 by a rear axle bar 6 (see FIG. 2) extending transversely beneath the bed adajcent its rearward end, being welded or otherwise fixed to bed 2 and having a ground-engaging wheel 8 carried rotatably at each end thereof, and a front axle bar 10 extending transversely beneath the bed adjacent its forward end and carrying a ground-engaging wheel 12 rotatably at each end thereof. The front axle bar, however, is not affixed to bed 2, but is pivoted thereto at 14 for tilting movement relative thereto on a horizontal axis extending fore-and-aft of the truck, and intermediate the sides of the bed. Front axle bar 10 is spaced well below the level of bed 2, and its tilting movement relative to the bed is limited by a pair of legs 16 affixed to and depending from bed 2 directly above the respectively opposite end portions of axle bar 10, their lower ends being spaced above said axle bar when said axle bar is parallel to the plane of the bed. Each of front wheels 12 is also pivotable about a vertical axis at the adjacent end of axle bar 10, and may be rotated about said vertical axis to steer the truck, by means including a towing tongue 18, provided to axle bar 10 and connected to steering rods 20, which are in turn connected to the front wheels. The steering means, however, is well known in the art and is not pertinent to the present invention. The rigidly mounted rear axle bar 6 maintains the bed upright, while the pivot 14 permits both front wheels to remain on the ground when the bed is tilted laterally by engagement of the rear wheels with uneven terrain.

Fixed to bed 2 at each of the front and rear ends thereof is a rigid strut 22, being fixed at its lower end to bed 2 intermediate the sides thereof and being inclined upwardly therefrom toward one side of the bed, its upper end being disposed generally in the vertical plane of that side of the bed, and being supported by a vertical post 24 rising from said bed. Carried on the bed also is a dump bucket 26, including a floor 28 normally resting on bed 2, an inclined side wall 30 normally resting against struts 22, a vertical side wall 32 rising from the opposite side of the bed, and vertical front and rear walls 34 and 36 rising from the front and rear edges of the bed, being open at its top. The bucket is formed of sheet metal, being reinforced by means including a rigid rail 38 affixed peripherally thereto at a horziontal level just above the upper ends of struts 22. The bucket, and its rail 38, is pivoted to the upper end of each of struts 22 by means of a pivot pin 40, the axes of said pivot pins being coaxial, horizontal, and extending fore-and-aft of the truck. The dump bucket may be pivoted about pins 40 from the normal upright position just described, and as shown in FIGS. 1 and 3 and in solid lines in FIG. 2, to the dump position shown in dotted lines in FIG. 2, by means of a pair of hydraulic rams 42 disposed respectively at the forward and rearward ends of the truck, externally of the dump bucket. The cylinder 44 of each ram is pivoted at its lower end, as at 46, to a bracket 48 affixed to bed 2, and the upwardly extending piston rod 50 is pivoted at its upper end, as at 52, to a bracket 54 affixed to bucket rail 38. The axes of all of the ram pivots are of course parallel to bucket pivots 40. The rams are double-acting, each having a pair of hydraulic connections 56 and 58 by means of which hydraulic fluid may be supplied from any suitable source, not shown, for selectively extending or retracting the rams.

The structure thus far described is well known, but is subject to a common malfunction. As the dump bucket is raised and tilted to the dotted-line dump position of FIG. 2, its center of gravity, and that of its contents, moves very substantially toward the side of the bed at which pivots 40 are disposed, or to the right as viewed in FIG. 2. The forward end of bed 2 is free to tilt about pivot 14 in response to this lateral shifting of the load, but the rearward end of the bed is not, because of the rigid mounting of rear axle bar 6. Thus the bed is subjected to a torsional stress about a fore-and-aft axis. If the bed deforms under this stress, rams 42 may be subjected to bending stresses interfering with their efficient operation, and possible causing bending or binding thereof. Insofar as actual tilting of the bed does occur, along any portion of its length, this tilting causes still further shifting of the center of gravity of the bucket load in the direction of tilting, or to the right as viewed in FIG. 2, and in extreme cases this may cause the entire dump truck to overturn on its side. If the entire bed is free to tilt laterally, as when it is supported above the axle bar at each of its wheels by a spring suspension, this tendency of the dump truck to overturn during the dumping operation is still more pronounced.

To prevent the troublesome and sometimes disastrous occurrences described above, the present invention contemplates the use of a lateral stabilizer operable to lock the bed against lateral tilting relative to any axle thereof with which it has a normal tilting relation. Of course, the stabilizer should be operative only during the dumping operation, since the tiltability of the axle is necessary during normal transport of the truck to preserve good riding characteristics thereof.

As shown, the stabilizer mechanism includes a pair of pawls 60 each pivoted at its lower end to the upper surface of axle bar 10 adjacent the respectively opposite ends of said axle bar, as at 62, and extending upwardly from said axle bar. Each of said pawls cooperates with a vertical, toothed, ratchet 64 which faces laterally outwardly of the truck and is rigidly affixed to any convenient portions of bed 2. The successive teeth 66 are vertically spaced apart, and face downwardly. At a point spaced above its pivotal mounting 62, each pawl has one end of a link 68 pivoted thereto, as at 70. The two links 68 extend toward the longitudinal centerline of the bed, and each is pivoted at its inner end, as at 72, to the downwardly extending leg 74 of an angled lever 76 which is pivoted at its angle, as at 78, to bed 2. Each of levers 76 also has a normally horizontal leg 80, legs 80 projecting toward and terminating just short of the midline of the bed, and having a metal pad 82 affixed to its free end. The pivot 72 at the junctures of lever legs 74 and links 68 are connected by a helical tension spring 84.

In operation, it will be noted that pads 82 of levers 76 are normally both disposed directly beneath floor 28 of dump bucket 26 when said bucket is in its normal upright position and supported on bed 2, as shown in FIG. 3, and are pressed downwardly by the weight of the bucket, forcing levers 76 to pivot against the tension of spring 84 to cause pivots 72 of links 68 to move farther apart laterally of the bed. Links 68, thus moved apart, force pawls 60 out of engagement with ratchet bars 64, also as shown in FIG. 3. This is the normal disengaged condition of the stabilizer, in which bed 2 is free to tilt on pivot 14 relative to axle bar 10, as is required for good running characteristics of the truck during transport.

However, whenever the truck is brought to a halt, and the extension of hydraulic rams 42 is commenced to initiate the tilting and dumping of the bucket, as previously described, floor 28 of the bucket immediately moves out of engagement with pads 82 of levers 76, allowing lever arms 80 to be pivoted upwardly by spring 84, as shown in FIG. 4, whereupon pivots 72 and links 68 are drawn closer together. This movement of links 68 pulls pawls 60 into engagement with teeth 66 of ratchets 64, thus locking bed 2 against lateral tilting relative to axle bar 10. When the dump bucket is returned to its normal upright position, it again pivots levers 76 against spring 84 to disengage the pawls. Of course, it is not essential that both of pawls 60 be utilized, as shown, in order to prevent downward movement of both sides of the bed toward axle bar 10, or in other words, to prevent tilting of the bed in either direction. The principal function is to prevent tilting of the bed toward the "dump" side thereof, or to the left as viewed in FIGS. 3 and 4, and this could be accomplished by use of only the left pawl. However, prevention of tilting in either direction is desirable, in order to prevent possible lateral oscillatory rocking of the bed, as could occur for example if it becomes necessary to oscillate the bucket on its pivots 40 to dislodge a "sticky" load therefrom.

Thus it will be apparent that a stabilizer having several advantages has been produced. Its operation is fully automatic, being engaged and disengaged as and when required without requiring action or the attention of the operator. Its setting is not at all delicate or critical since spring 84 moves both of the pawls whatever distance may be required to effect engagement thereof with the ratchets, even though these distances may be unequal. The truck and bed need not be accurately levelled prior to engagement of the stabilizer, since each pawl may engage any one of a series of ratchet teeth.

While I have shown and described a specific embodiment of my invention, it will be readily apparent that many minor changes of structure and operation could be made without departing from the spirit of the invention.

What I claim as new and desire to protect by Letters Patent is:

1. In combination with a dump truck including a dump bucket carried by a truck bed, and pivoted along one of its upper side edges to said bed for movement from a normal upright position generally centered over said bed to a generally inverted dump position to dump its contents at one side of said bed, said bed being supported by ground-engaging wheels carried rotatably at the opposite ends of each of one or more transversely extending axle bars, and being transversely tiltable with respect to at least one of said axle bars, a lateral stabilizer comprising:

a. a locking device associated with each of the axle bars relative to which said bed is tiltable and operable when engaged to secure said bed against tilting toward the side of the bucket at which the contents of the bed are dumped, said locking device comprising a pawl and a ratchet carried respectively by said axle bar and said bed, said pawl being pivoted to said axle bar for movement between an engaged position against said ratchet and a disengaged position spaced apart from said ratchet, and b. control means operable selectively to engage and disengage said pawl.

2. A stabilizer as recited in claim 1 wherein said control means is operable responsively to the position of said dump bucket, being operable whenever said bucket is moved from its normal upright position to move said pawl to its engaged position, and to move said pawl to its disengaged position whenever said dump bucket is returned to its normal upright position.

3. A stabilizer as recited in claim 1 wherein said ratchet includes a series of teeth spaced apart in the direction of movement of said axle bar relative thereto during tilting of said bed, whereby said pawl, when moved to its engaged position, can engage one of said teeth regardless of the degree of tilt of said bed.

4. A stabilizer as recited in claim 1 wherein said control means coprises:

a. a lever pivoted to said bed within the path of said dump bucket relative to said bed, and operable to be engaged by said bucket and pivoted in one direction as said bucket approaches its normal upright position, b. means connecting said lever to said pawl and operable to move said pawl to its disengaged position as said lever is pivoted in said one direction, and c. resilient means biasing said lever in an opposite direction, whereby said connecting means moves said pawl to its engaged position whenever said dump bucket is moved from its normal upright position.

5. A stabilizer as recited in claim 4 with the addition to a second pawl, ratchet, lever, connecting means and resilient means, identical in all respects to those recited in claim 8 except that the second pawl and ratchet, when engaged, are operable to secure said bed against lateral tilting in an opposite direction.

* * * * *